Oct. 16, 1951     V. E. HAMILTON, JR     2,571,236
APPARATUS FOR TESTING PIPE JOINTS FOR LEAKS
Filed Aug. 19, 1948
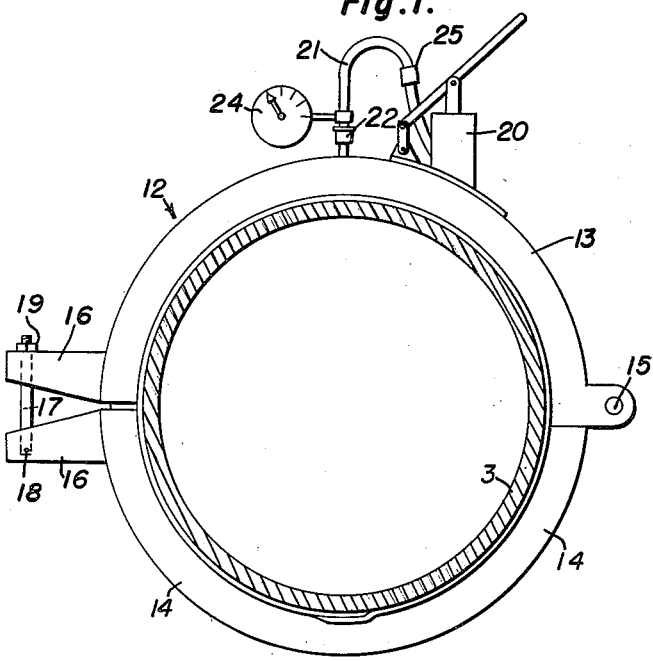
Fig. 1.
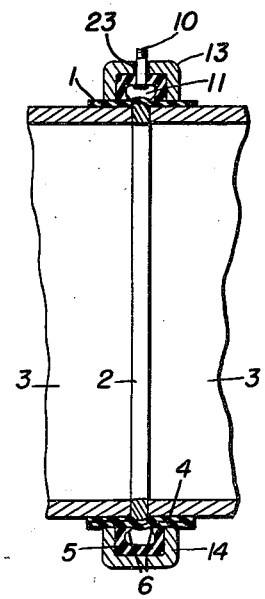
Fig. 2.
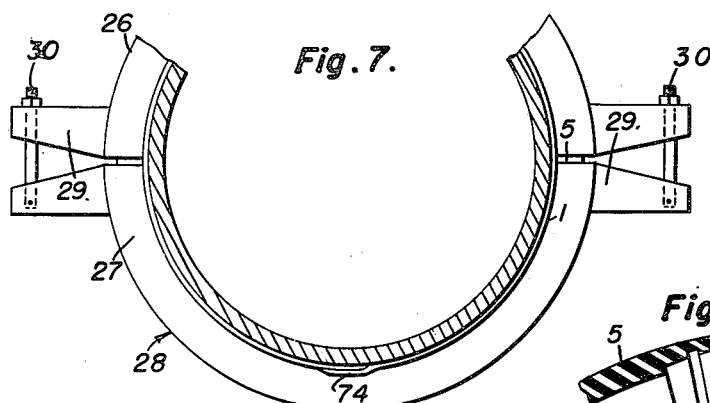
Fig. 7.
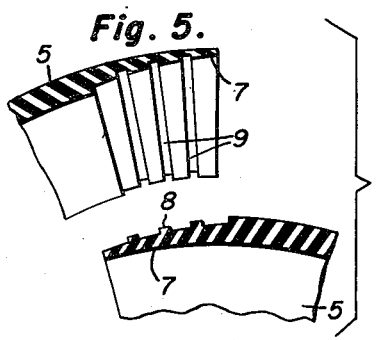
Fig. 3.
Fig. 5.
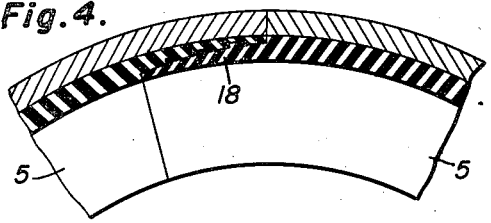
Fig. 4.
Fig. 6.
Vivian E. Hamilton, Jr.
INVENTOR.
BY *Clarence A. O'Brien*
*and Harvey B. Jackson*
Attorneys Patented Oct. 16, 1951

2,571,236

UNITED STATES PATENT OFFICE 2,571,236

APPARATUS FOR TESTING PIPE JOINTS FOR LEAKS

Vivian E. Hamilton, Jr., Shreveport, La.

Application August 19, 1948, Serial No. 45,019

4 Claims. (Cl. 73—46)

My invention relates to improvements in apparatus for testing pipe joints for leaks and especially, although not necessarily, welded pipe joints.

The primary object of the invention is to provide time and labor saving apparatus of simple form and inexpensive construction adapted especially for testing leaks in welded pipe joints and precisely locating such leaks.

Another object is to provide apparatus for the above purpose adaptable for use in testing various kinds of pipe joints other than welded joints.

Still another object is to provide apparatus for the above purposes which does not require any special skill in applying and using the same, and which will not get out of order under prolonged use.

Other and subordinate objects, within the purview of my invention, together with the precise nature of my improvements will be readily understood when the succeeding description and claims are read with reference to the drawing accompanying and forming part of this specification.

In said drawing:

Figure 1 is a view in side elevation, partly in section, illustrating my improved apparatus applied to a pipe joint and a preferred embodiment of the invention;

Figure 2 is a fragmentary view in longitudinal section with parts eliminated to avoid confusion in illustrating;

Figure 3 is a fragmentary view in edge elevation illustrating the means for drawing the clamping sections together;

Figure 4 is a fragmentary view in longitudinal section drawn to a larger scale and illustrating the overlapping interlocking ends of the gasket;

Figure 5 is a composite view of the overlapping interlocking ends of the gasket separated;

Figure 6 is a view in perspective, partly broken away, of the blow-out strip;

Figure 7 is a fragmentary view in side elevation, partly in section, illustrating a modification of the invention.

Referring to the drawing by numerals, and especially to Figures 1 to 6 thereof, the apparatus of my invention comprises, in the preferred embodiment thereof, a blow-out strip 1 of paper thin, impervious, puncturable material, such as rubber, adapted to be placed around the weld 2 joining ends of pipe sections 3, with ends of the strip overlapping, as shown at 4, and which is wider than the weld 2 to overlie the pipe sections 3 upon opposite sides of the weld 2 a distance suitable for a purpose presently seen.

A channeled sealing gasket 5 of resilient material, preferably rubber, is provided for positioning in centered relation around the applied blow-out strip 1 with the channeled side of the gasket intermost and straddling the weld 2. The gasket 5 is provided with widened sealing edges 6 for imposing against said strip 1 and is relatively narrower than said strip 1, for a purpose presently seen.

The gasket 5 is split transversely for positioning around the blow-out strip 1 and provided with tapered ends 7 of reduced thickness for overlapping and fitting together with transverse ribs 8 on one end fitting in similar grooves 9 in the other end, all so that said ends may be fitted together in interlocked sealed relation with the outer and inner sides of the gasket concentric when applied.

An air inlet valve 10, similar to the conventional tire valve, is provided in the gasket 5 to extend out of the channel 11 of said gasket.

A metal clamp 12 is provided comprising a pair of arcuate internally channeled sections 13, 14 for fitting around the blow-out strip 1 and over the gasket 5 with the sections 13, 14 drawn together in ring form. Preferably, the sections 13, 14 are hinged together at ends thereof on one side of the clamp, as at 15, for drawing together to draw the edges thereof tight against the blow-out strip 1 at opposite sides of the gasket 5 so as to compress the side edges of said strip 1 into sealing relation to the pipe sections 3 at opposite sides of the weld 2 and said gasket 5, while, at the same time compressing the gasket 5 to tightly engage the sealing edges 6 thereof with the blow-out strip 1 upon opposite sides of the weld 2. Thus, a double seal is formed around the gasket 5 for preventing the escape of fluid pressure introduced into the channel 11, for a purpose presently seen, while, at the same time, a double seal is formed upon opposite sides of the weld 2 between the blow-out strip 1 and the pipe sections 3. To permit the required compression of the gasket 5, the sealing edges 6 thereof are normally extended out of the channeled sections 13, 14.

To draw the sections 13, 14 of the clamp 12 together, the ends of said sections on the side of the clamp opposite the hinge 15 are provided with outstanding pairs of lugs 16, one pair having a draw bolt 17 pivoted between the same, as at 18, for swinging in between the other pair of lugs for tightening of a nut 19 on said bolt to draw the pairs of lugs 16 together and similarly draw the channeled sections 13, 14.

A fluid pump 20, preferably for air, forms part of the apparatus and is suitably mounted, preferably, on one channeled section 13 of the clamp 12 with a flexible air supply line 21 having an end coupling 22 for attachment to the air valve 10 which extends out of a suitable opening 23 in the channeled section 13. A suitable pressure gage 24 is interposed in said line 21 also a back pressure valve 25.

In the modification of my invention shown in Figure 7, the channeled sections designated 26, 27 of the clamp, designated 28 may be fastened and drawn together on both sides of the clamp by pairs of lugs 29 and draw bolts 30 similar to the lugs 16 and draw bolts 17.

In using the described apparatus, applied in the manner described, fluid, preferably air, is pumped into the channel 11 of the gasket 5 to any pressure found suitable for the purpose, the pressure being registered on the fluid pressure gage 24. If the weld 2 is defective, for instance with a pin hole or holes therein, the blow-out strip 1 will puncture at the defect, or hole, or holes, and allow the fluid to escape through the puncture, or punctures, out of the channel 11 with a resultant drop in pressure registered previously by the fluid pressure gage 24, thereby advising the operator that the joint is defective. The clamp 12 and the gasket 5 may then be removed and the blow-out strip 1 inspected, while still surrounding the weld 2, to locate the puncture, or punctures in said strip and thereby locate the leak, or leaks in the weld 2.

By eliminating the blow-out strip 1 and clamping the gasket 5 directly to the pipe sections 3 with the channel 11 straddling the weld 2, the apparatus may be used to test such pipe joints for leaks, without locating the leaks. In this use of the apparatus, a leak in the weld 2 will result in a drop in fluid pressure in the channel 11, as will be clear, and resulting in drop in the pressure registered by the fluid pressure gage 24. This will advise the operator that the weld is defective as far as leaks are concerned.

In connection with the use of the apparatus described in the preceding paragraph, obviously the apparatus may be used in the same manner to detect leaks in other types of pipe joints, than welded joints, and which the clamp 12 and gasket 5 are capable of straddling.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. Apparatus for testing a pipe joint for leaks comprising a thin strip of puncturable material for application around the pipe over the joint to be punctured by air pressure against the strip over a leak in the joint, an annular channeled gasket for fitting over said strip and straddling said joint and forming with said strip an annular channel around said joint for confining air under pressure exerting pressure against said strip, an annular clamp for application around said strip and gasket in surrounding relation thereto and compressing said strip against said pipe and said gasket against said strip upon opposite sides of said joint to prevent air from escaping out of said channel to atmosphere, and means to introduce air under pressure into said channel.

2. Apparatus according to claim 1 wherein said clamp comprises arcuate channel sections for straddling said gasket and joint, and fastening means for connecting said sections together in annular form.

3. Apparatus for testing a pipe joint for leaks comprising a strip of thin puncturable material for application around said pipe over said joint to be punctured by air pressure against said strip opposite a leak in the joint, an annular channeled member of elastromeric material for application over said strip around said joint and forming with said strip an annular channel around said joint for confining air under pressure exerting pressure directly against said strip, an annular channeled clamp for application around said strip and member in straddling relation to the member and compressing said strip against said pipe and said member against said strip upon opposite sides of said joint to prevent air from escaping out of said channel to atmosphere, and means for introducing air under pressure into said channel.

4. Apparatus according to claim 3 wherein said annular member is split and the ends are provided with interlapping and interlocking means for connection together.

VIVIAN E. HAMILTON, JR.

REFERENCES CITED

The following references are of record in the file of this patent:

UNITED STATES PATENTS

| Number | Name | Date |
|---|---|---|
| 1,788,845 | Reynolds | Jan. 13, 1931 |
| 1,931,502 | Markle et al. | Oct. 24, 1933 |
| 2,062,435 | Weiland | Dec. 1, 1936 |
| 2,416,441 | Grant | Feb. 25, 1947 |

FOREIGN PATENTS

| Number | Country | Date |
|---|---|---|
| 229,048 | Great Britain | Feb. 19, 1925 |